United States Patent
Machiraju et al.

(10) Patent No.: US 8,473,970 B2
(45) Date of Patent: Jun. 25, 2013

(54) FRAMEWORK FOR INTEGRATING APPLICATIONS

(75) Inventors: Rama Rao Pakasasana Machiraju, Andhra Pradesh (IN); Christopher Scott Nash, Belmont, CA (US); Jason Anthony Wu, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 528 days.

(21) Appl. No.: 12/712,354

(22) Filed: Feb. 25, 2010

(65) Prior Publication Data

US 2011/0209162 A1    Aug. 25, 2011

(51) Int. Cl.
*G06F 3/00* (2006.01)
(52) U.S. Cl.
USPC ........................................... 719/328
(58) Field of Classification Search
None
See application file for complete search history.

(56) References Cited

U.S. PATENT DOCUMENTS

| | | | |
|---|---|---|---|
| 6,334,158 B1* | 12/2001 | Jennyc et al. | 719/328 |
| 7,398,533 B1* | 7/2008 | Slaughter et al. | 719/328 |
| 2005/0223392 A1* | 10/2005 | Cox et al. | 719/328 |
| 2009/0055838 A1* | 2/2009 | Sedukhin et al. | 719/318 |
| 2009/0249369 A1* | 10/2009 | Itoh et al. | 719/328 |
| 2011/0047014 A1* | 2/2011 | De Angelo | 705/14.4 |
| 2011/0099147 A1* | 4/2011 | McAlister et al. | 707/639 |

* cited by examiner

*Primary Examiner* — Emerson Puente
*Assistant Examiner* — Gregory A Kessler
(74) *Attorney, Agent, or Firm* — Campbell Stephenson LLP

(57) ABSTRACT

A framework for integrating applications using the Workflow Toolkit provides a graphical development environment for developing an Extensible Workflow. The Workflow Toolkit may include a user interface displaying a first list of application programming interface (API) services provided by a first application and a second list of API services provided by a second application. The Workflow Toolkit may then generate an integration component in response to a user selecting both a first API service from the first list and a second API service from the second list. The integration component can then be called from the first API service, and the integration component in turn calls the second API service. In response to the second API service being called, the second API service may return a result. When this result is received by the integration component, the integration component may return an integration result based on the result received from the second API.

18 Claims, 8 Drawing Sheets

FRAMEWORK FOR INTEGRATING APPLICATIONS

BACKGROUND

Software applications can be designed to execute independently, such as a game on a desktop computer. However, a software application can often provide greater functionality when it communicates with another software application. For example, a computer executing a web browser would be nearly worthless unless the browser were able to communicate over the Internet with a web server executing an application hosting a web site. The ability of the web browser to communicate with the web hosting application greatly increases the functionality of the web browser.

Unless an application is designed to operate independently, the application must have some method for communicating with another application. A web browser can communicate with a web hosting application because there is a standard protocol by which these two applications may communicate—hypertext transfer protocol (HTTP).

However, when the two software applications are specialized products, there is often no standard protocol available by which the applications can communicate. In such a case, one method by which applications can communicate is through use of an application programming interface (API). An API specifies the means by which services provided by one application can be used by another application. An API describes how to communicate with the application. In other words, an API is similar to an application's own personalized communication protocol.

DETAILED DESCRIPTION

Figure 1:
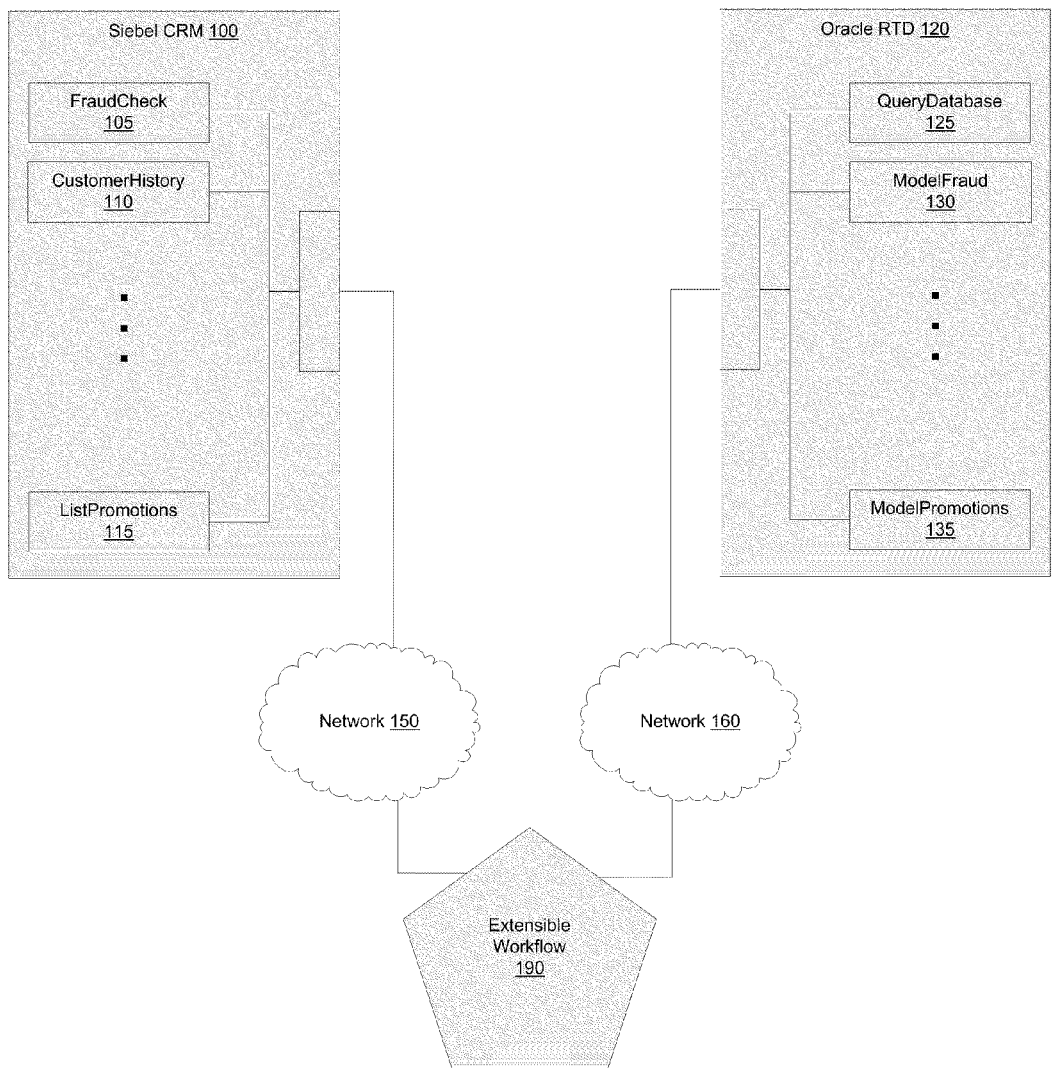
FIG. 1 presents a runtime example of an Extensible Workflow integrating two individual applications.

If a first application intends to use services provided by a second application, the first application must make use of the second application's API. In other words, for the first application to communicate effectively with the second application, the first application must be aware of how the second application can communicate. Programming the first application to use the second application's API results in an integration of the first and second applications.

Another method for integrating two applications is through a third, intermediary application. In this arrangement, the first application is integrated with the intermediary application, and the intermediary application is integrated with the second application. This transitive chain of integration effectively results in the first application being indirectly integrated with the second application.

A Workflow Toolkit provides a graphical development environment for developing an Extensible Workflow. The Extensible Workflow is akin to the intermediary application above, and serves to integrate two or more applications. Using an Extensible Workflow, when the first application's API changes, the integration between the first and second applications can be updated quickly. An update to the Extensible Workflow is more efficient because the first and second applications will usually be large, complex software projects that require greater effort to update. By contrast, the Extensible Workflow is a more focused piece of software and can be updated easily using the Workflow Toolkit graphical development environment.

Directly integrating applications using standard software coding techniques is within the capabilities of an ordinary artisan. However, this software development process, similar to most software development, is meticulous and complex. As a result, the traditional process is time-consuming and expensive. Because of these development costs, there is a negative impact on the speed with which a business may respond to changing business needs as reflected in the changing requirements in application features. These problems are magnified with large software projects.

The API of an application specifies the services provided by an application. A service is a software routine or module that performs a specialized task. For example, a math application that performs math operations may provide a service named ADDITION( ) requiring a certain number of parameters. Parameters can serve as arguments through which inputs and outputs may be passed. For example, the ADDITION( ) service may require three parameters, a first value, a second value, and a result variable in which to store the result. In this case, any application that wishes to use the ADDITION( ) service provided by the math application merely needs to refer to the math application's API. By referencing the API, an application developer learns that to perform an addition of some numbers, it may use a service provided by the math application, named ADDITION( ) which provides that service. The API will also specify the type and quantity of parameters necessary to call the ADDITION( ) service.

For each service provided by an application, the API will specify parameters and data types and how and what type of result or results will be returned. A software engineer must bridge the different applications by developing software that appropriately integrates the aspects of the services of one application with the aspects of the services of another application.

One example of an application able to communicate with another application is Siebel's Customer Relationship Management ("Siebel CRM") system. An example application that can be integrated with the Siebel CRM is Oracle's Real-Time Decisions ("Oracle RTD") platform.

One feature of the Siebel CRM is to guide a company agent's interaction with a customer by providing the company agent with direction regarding how to keep or make the customer satisfied. One way for improving customer satisfaction is by offering the customer a special promotion during the course of the phone call with the customer. While the Siebel CRM provides the user interface displaying the promotions to offer a customer, the Siebel CRM does not make the decision regarding which promotions to offer. Instead, the Siebel CRM provides customer information collected by the company agent and sends this customer information to the Oracle RTD. This process may begin, for example, when the company agent clicks an icon in the Siebel CRM user interface for generating and displaying a list of promotions. As a result of the click on the icon, the Siebel CRM makes a call to a service provided by the Oracle RTD for determining a list of promotions suitable to the given customer. As another example, as soon as a customer is identified, the Oracle RTD can be automatically invoked based on the customer's information. Information returned from the Oracle RTD may then be presented back to the company agent in the form of an alert regarding several issues the company agent should be made aware of, such as the likelihood for customer churn or special promotions available for the customer.

The Oracle RTD receives the customer information through the service call made by the Siebel CRM and generates a list of promotions to offer the customer. This list of promotions to offer will be tailored to the customer in order to keep the customer satisfied, with the goal of avoiding customer churn—the loss of the customer. The enticement level of the recommended list of promotions made by the Oracle RTD can correspond with the probability determined by the Oracle RTD that the particular customer may be lost. This tailored recommendation avoids offering every single customer the same promotion when it may take varying degrees of promotion expense to keep the customer satisfied. In this way, the goal of avoiding customer churn is achieved in a cost-effective way by the use of the integrated applications.

An added level of complexity to integrating two different applications is when one or both of the applications have a programming interface that is modified. For example, when a new service is added as part of a new feature to the Siebel CRM, the Siebel CRM API must be extended in order to integrate the new service with the Oracle RTD. This extension of the functionality of the Siebel CRM will require a software development effort similar to the initial effort of integrating the Siebel CRM and the Oracle RTD. As a consequence, when two applications are integrated on a one-to-one, service-to-service basis, not only is the initial integration of the applications resource intensive, but any future changes to either integrated application will also be resource intensive.

As an example, if a company decides that it needs to be more vigilant against fraud, it may provide the Siebel CRM with the ability to display an alert to the company agent during a customer call. In order to implement the alert, the programming interface for the Siebel CRM may be extended to provide a method by which information regarding fraud may be sent to the Oracle RTD. Similarly, the Oracle RTD programming interface can be extended to receive the information pertaining to the customer in order to generate a decision on how high the risk for fraud is given the customer information. Thus, in order to provide the new service for fraud detection in the Siebel CRM, the software developed to integrate the Siebel CRM with the Oracle RTD must be reprogrammed to implement the new service.

Thus, it is a difficult task to integrate two applications and to maintain the integration. This difficulty is present during the initial integration of the two applications and at any point in the future when the functionality of either application is extended.

The resource-intensive problem of integrating multiple applications, described above, can be solved by the Workflow Toolkit graphical user interface serving as a development environment for creating an Extensible Workflow. By using the Workflow Toolkit, a developer may avoid many aspects of the traditional software development cycle that are expensive, time-consuming, and error-prone.

An embodiment of the Workflow Toolkit enables a developer to create an Extensible Workflow in a visual, declarative, plug-and-play manner.

The Workflow Toolkit provides a software engineer with a graphical development environment in which to create and compile an Extensible Workflow. In the Workflow Toolkit, the Extensible Workflow is constructed by dragging and dropping visual components within a Workflow Toolkit user interface, which are representative of the aspects of the applications being integrated. These visual components may be representative of service calls, and various types of metadata. The result is a plug-and-play development environment for creating the Extensible Workflow executable.

The Extensible Workflow may be invoked, for example, in the circumstance when the Siebel CRM would otherwise make a call to the Oracle RTD. However, with the introduction of the Extensible Workflow, instead of calling the Oracle RTD directly, the Siebel CRM will now call the Extensible Workflow. In other words, the Siebel CRM communicates with the Extensible Workflow and the Extensible Workflow in turn communicates with the Oracle RTD.

The call to the Extensible Workflow may result from the occurrence of an event, such as when a company agent, dealing with a customer, clicks on an icon labeled "Fraud Check" within the Siebel CRM's user interface. As a result of the fraud check event, a service within the Siebel CRM may be called to provide information on whether fraud is likely given the current customer information obtained by the company agent. In turn, the invoked service within the Siebel CRM may call the Extensible Workflow. The Siebel CRM need not be aware that the Extensible Workflow is also integrated to the Oracle RTD.

The Extensible Workflow, when invoked by the Siebel CRM, may determine how to provide the result expected by the Siebel CRM. While the Siebel CRM is aware of the Extensible Workflow, a benefit of being able to communicate with the Extensible Workflow is that if the API of the Oracle RTD changes, these changes will be invisible to, and thus ignorable by, the Siebel CRM. The Extensible Workflow will need to be updated to account for the changes to the API of the Oracle RTD; however, the Siebel CRM can communicate with the Extensible Workflow as before.

Another benefit of having the Siebel CRM integrate with the Extensible Workflow instead of the Oracle RTD is if the Oracle RTD is replaced with another application, the Siebel CRM will not require reprogramming. Only the Extensible Workflow will need to be recompiled in order to account for the new application replacing the Oracle RTD. Because the Extensible Workflow can be developed quickly using the Workflow Toolkit, the result is a quick turnaround time for bringing the new combination of applications into service.

An additional improvement provided by the Workflow Toolkit is that aspects of the integration can be specified declaratively, without the use of traditional, imperative, software programming. The benefit of setting up part of the integration process declaratively is that a developer integrating the applications is allowed to work at a higher level than low-level software code. This results in the avoidance of many negative aspects of traditional software coding, such as unexpected side-effects from imperative software code.

For example, a developer may declaratively set up events and responses within the Extensible Workflow. In other words, the developer may describe what work should be done instead of specifying an algorithm indicating how the work is done. Using the Workflow Toolkit, the developer can set up outcomes for an event declaratively, without having to write imperative software code. In other words, a user can specify commands for performing some action without having to specify the algorithm and instructions for exactly how to carry out the command.

In one embodiment, the ability of the Extensible Workflow to handle all interactions between two or more applications by the use of a single generic workflow eliminates the resource intensive need for software developers to develop integration code for interfacing each routine or service on one application to another routine or service on another application in a one-to-one fashion.

Without the Extensible Workflow to integrate applications, it follows that one application, to integrate to three applications, could be required to develop software code for communicating with three APIs. This added complexity can be avoided by using the Extensible Workflow as a common integration point. That is, the one application can be integrated to the Extensible Workflow, and the Extensible Workflow can be integrated to the three applications. In this way, the one application only needs to be aware of one other application, the Extensible Workflow, not three other applications.

These various embodiments of the Workflow Toolkit can result in a significant reduction of the amount of resources necessary for integrating two or more applications.

FIG. 1 presents an example Extensible Workflow that integrates two individual applications. For this example, the first application can be the Siebel CRM and second application can be the Oracle RTD.

The Siebel CRM may be coupled to the Extensible Workflow through Network 150, and the Oracle RTD is coupled to the Extensible Workflow through Network 160. The Siebel CRM may execute on a first computer system, the Oracle RTD may execute on a second computer system, and the Extensible Workflow may execute on a third computer system.

Each computer system may be composed of at least one processor for executing the application software. Further, each computer system may be coupled to a computer-readable storage medium, in which instructions for executing the application software are stored.

Figure 2:
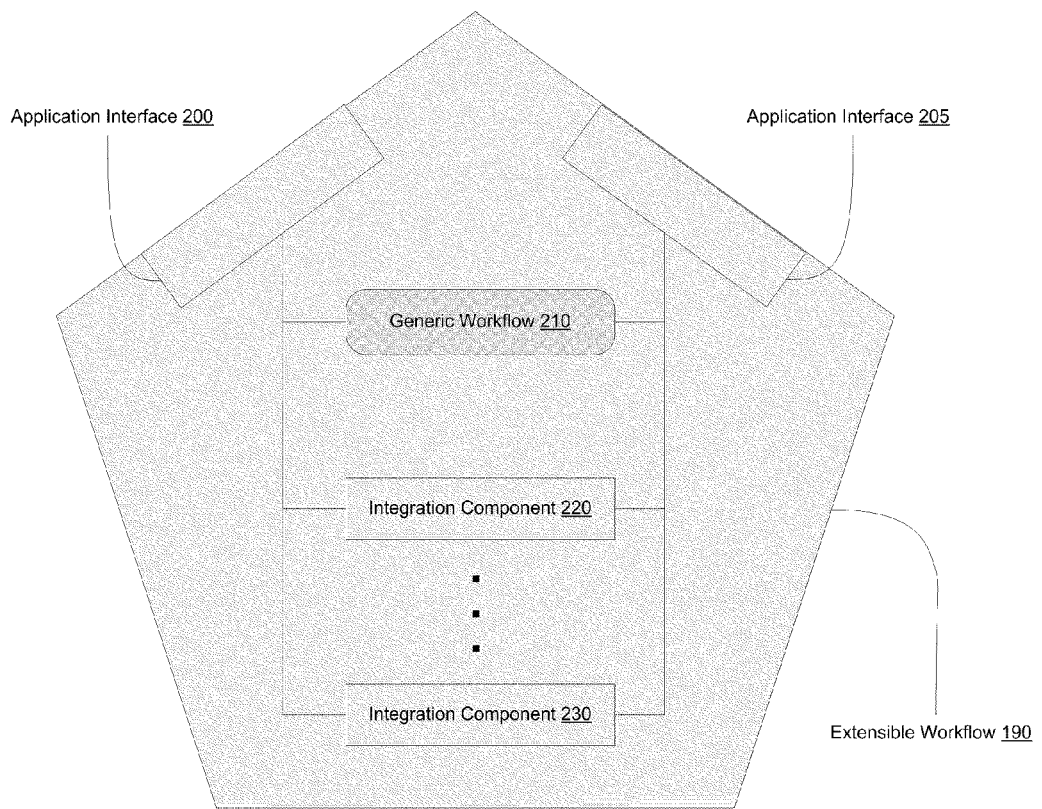
FIG. 2 presents an example list of executable software modules, corresponding to services, within the runtime Extensible Workflow.

FIG. 2 presents an example list of executable software modules, or services, within the runtime Extensible Workflow. Each of the services can communicate with the Siebel CRM through Application Interface 200. Further, each service may communicate with the Oracle RTD through Application Interface 205.

During runtime, when a service of the Siebel CRM processes an event and calls the Extensible Workflow, Application Interface 200 receives the call. The Siebel CRM calls the name of the service within the Extensible Workflow. This call will be made to either the Generic Workflow 210 service, or one of the integration component services. This is further explained is the below discussion for FIG. 6.

Figure 6:
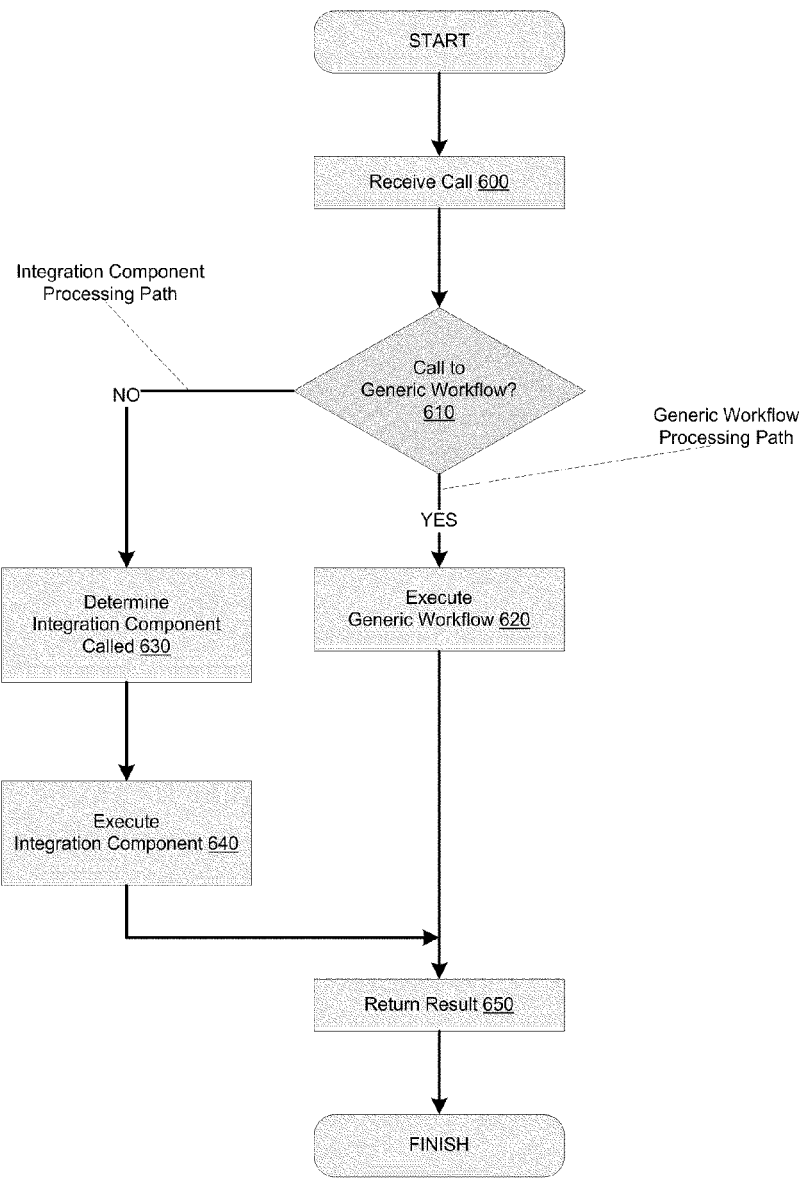
FIG. 6 presents a flow chart of two main runtime processing branches that may be taken within the Extensible Workflow.

FIG. 6 presents a flow chart that describes the two different processing paths within one embodiment of the Extensible Workflow. Each of the two processing paths corresponds to a method by which the applications can be integrated. The two processing paths are the Generic Workflow processing path and the Integration Component processing path.

In the Generic Workflow processing path, the Extensible Workflow provides one service that can serve as the sole integration point between the Siebel CRM and the Extensible Workflow. In FIG. 2, this service is Generic Workflow 210. In this first example, every call the Siebel CRM makes to the Extensible Workflow is made to service Generic Workflow 210. The services requested by the Siebel CRM of Generic Workflow 210 are distinguished by an event type. When the Siebel CRM calls Generic Workflow 210, an event type is passed to Generic Workflow 210 as a parameter. Generic Workflow 210 uses the event type, in conjunction with stored metadata, to determine which service within the Oracle RTD to call. For example, the event type may indicate that a calculation of the probability that a customer will close their account should be performed. This information may in turn be used to make the appropriate Oracle RTD service call.

In the Integration Component processing path, the Extensible Workflow provides one or more services that each provide a specialized service. In FIG. 2, these services are Integration Component 490 through Integration Component 230. These services may be given names that are more descriptive during development. In this embodiment, Integration Component 490 may implement a service such as calculating the probability that a customer will be closing their account. The Siebel CRM need not be aware of how Integration Component 490 arrives at the calculation. In this example, Integration Component 490 can call a service within the Oracle RTD that can perform this calculation.

In the Integration Component processing path, each integration component can be a service designed to integrate one service of the Siebel CRM with one or more services of the Oracle RTD. Collectively, all integration components, as part of the Extensible Workflow, can serve to integrate the Siebel CRM with the Oracle RTD. In each case, Application Interface 200 will determine which service within the Extensible Workflow the Siebel CRM is calling, and in turn will call the corresponding service.

While the Integration Component processing path does not provide the single integration point of the Generic Workflow processing path, there are still benefits to performing the integration by the Extensible Workflow in this fashion. This is especially apparent when the Extensible Workflow integrates the Siebel CRM with more than one application. In such a case, the Siebel CRM can provide a consistent interface to the Siebel CRM when the underlying application changes or additional applications are introduced.

Figure 3:
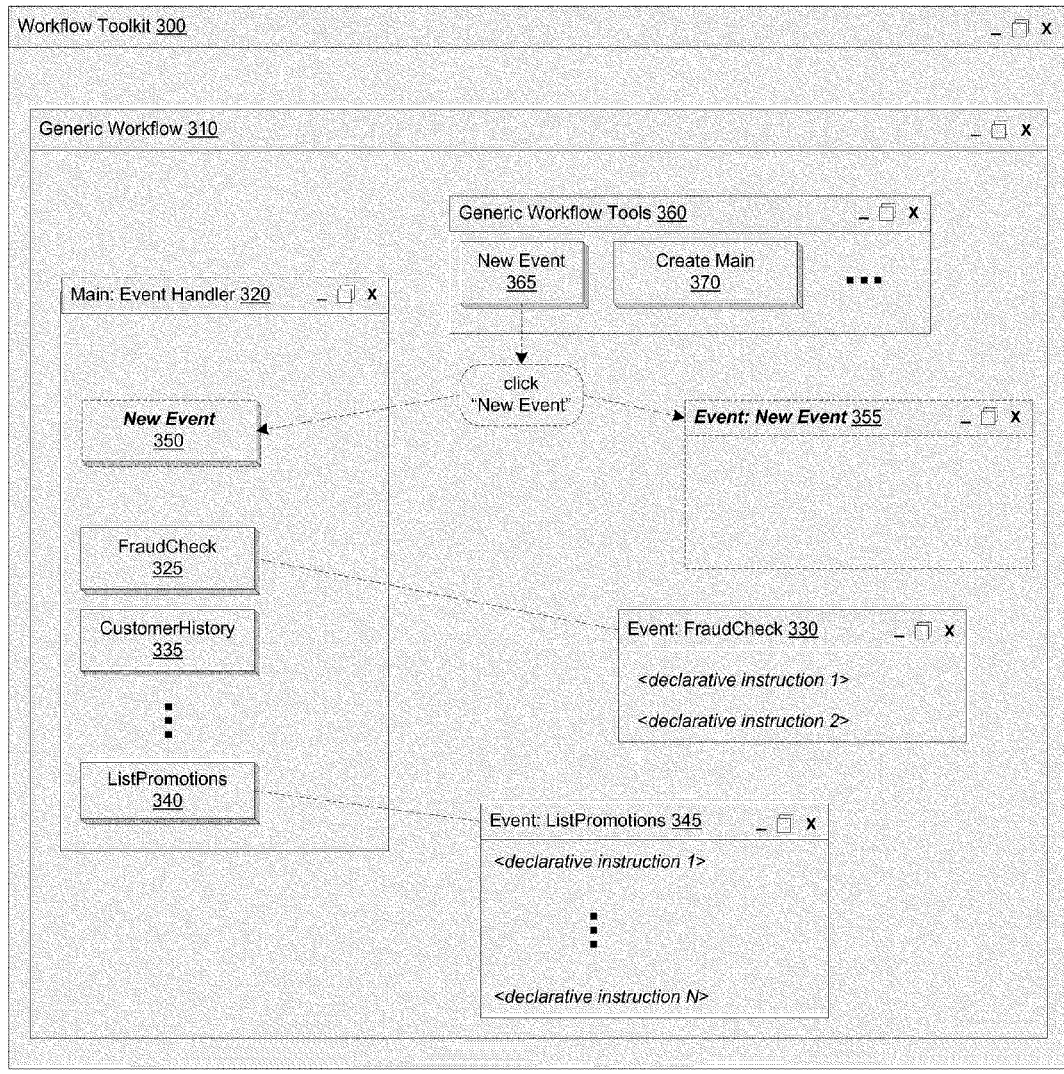
FIG. 3 presents aspects of the development area within the Workflow Toolkit for the developing a Generic Workflow service.

FIG. 3 presents a few aspects of the Workflow Toolkit development environment that can create the Generic Workflow. The Workflow Toolkit user interface provides several features for developing the Generic Workflow. One feature is the Generic Workflow Tools 360 window, listing a variety of tools.

To create a Generic Workflow, a user may first create a main event handler. This main event handler can be created by clicking the "Create Main 370" button within the "Generic Workflow Tools 360" window. The elements of the main event handler window, when compiled, will correspond to the Generic Workflow service.

When the Siebel CRM calls the Generic Workflow, the Siebel CRM will at least provide an event type as a parameter. The Generic Workflow will determine which Oracle RTD service to call based on the event type and metadata associated with the event type. In this case, the metadata may describe the expected result based on the event type. Because the expected result depends, in part, on the event type, the Generic Workflow service is polymorphic. A polymorphic function can evaluate to or be applied to values of different types. In other words, a polymorphic function can return different types of data.

Within the development environment, the behavior of the Generic Workflow given the event type and associated metadata may be specified using declarative instructions.

For each event type, a user may create a specific event handling routine within the main event handling routine. The specific event handling routine can be created by the user clicking the "New Event 365" button within the Generic Workflow Tools 360 window. Once a new event handling routine is created, such as New Event 350, an event type can be associated with the newly created event handling routine. The actions to be taken when the particular event type is received by the Generic Workflow during runtime can be specified by the user within the event specification window. An event specification window is provided for each new event handling routine created, such as "Event: New Event 365", which is associated with the "New Event 350" event handling routine within the "Main: Event Handler 320" window. It is within this window that the user may specify the relevant declarative instructions.

Once an event handling routine is specified for each event type, a user may compile to the Generic Workflow to create the Extensible Workflow executable.

Figure 8:
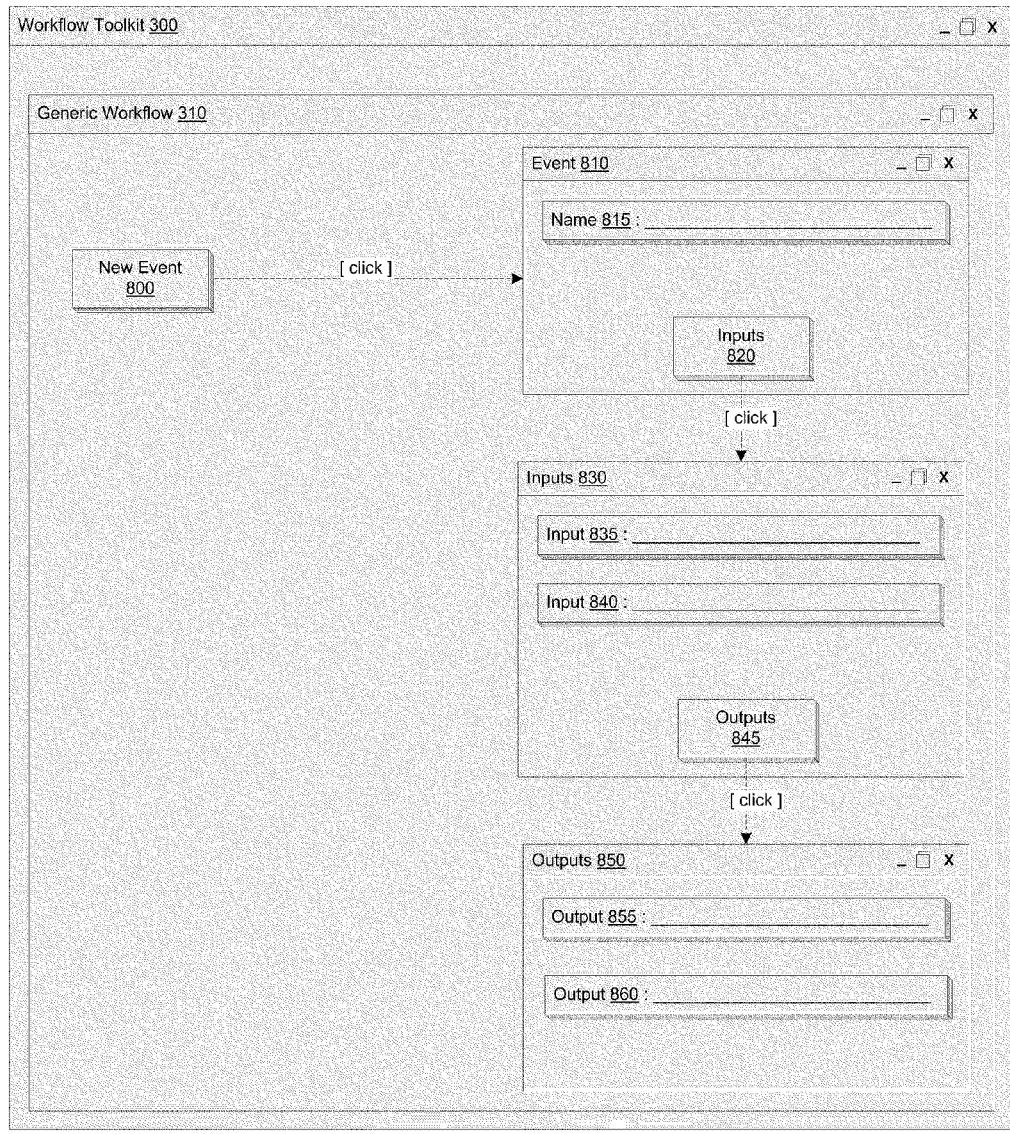
FIG. 8 presents aspects of the user interface elements that may be used in creating a new event.

FIG. 8 presents another embodiment for creating and defining a new event. In its simplest form, a Generic Workflow may only consist of handling a single event. For example, within the Generic Workflow 310 window, a user may select to create a new event. From this point, a user may then specify the quantity and types of inputs and outputs expected. The expected output will both affect how the Oracle RTD will determine a result and how the result will ultimately be displayed within the Siebel CRM user interface.

While the definition of a Generic Workflow may only handle a single event, in an ordinary operating environment, there will be many different types of events that may invoke the Generic Workflow. The event types will depend on the applications being integrated and the varieties of information that may possibly be exchanged between the applications.

Figure 7:
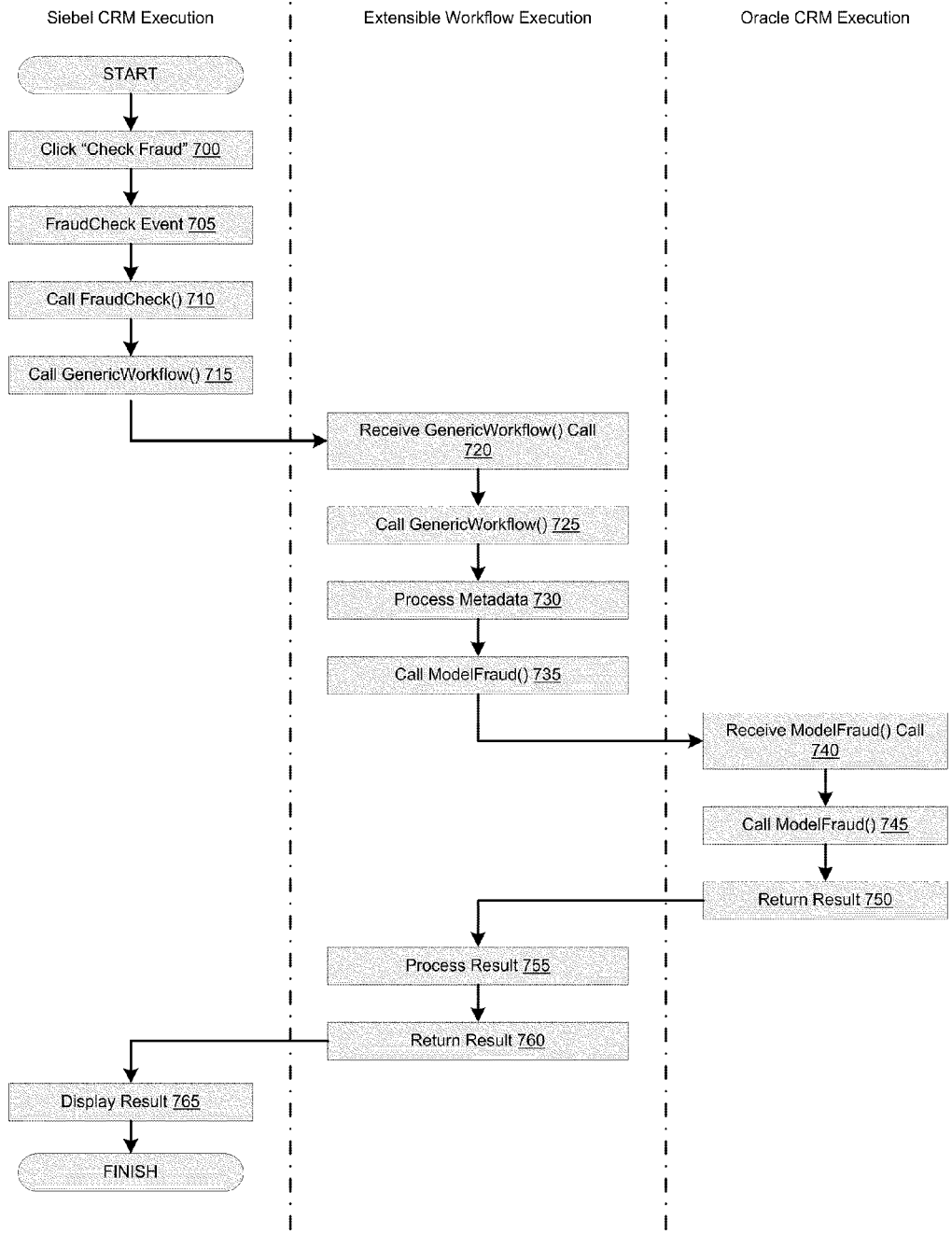
FIG. 7 presents one processing path that may be taken when the Generic Workflow service is called during runtime.

FIG. 7 presents several aspects of an example processing path that may be taken when the Generic Workflow service is called. This processing path taken when the Generic Workflow service is called partially overlaps with the flow chart in FIG. 6.

This example begins when a company agent using the Siebel CRM clicks, for example, on a "Check Fraud" icon within the Siebel CRM user interface. This click will generate an event that results in the Siebel CRM FraudCheck service being called. The Siebel CRM FraudCheck service may in turn call the GenericWorkflow service. This call to the GenericWorkflow is received by the Extensible Workflow runtime application.

At this point, the GenericWorkflow uses the event type received from the call to determine which Oracle RTD service to call. Once the event type is processed, the Oracle RTD service ModelFraud may be called. This call to ModelFraud is received by the Oracle RTD runtime application.

The Oracle RTD ModelFraud service may then calculate the result expected by the GenericWorkflow service. After calculating the result, the Oracle RTD ModelFraud service returns a result to the GenericWorkflow service.

The GenericWorkflow service may then perform any processing necessary for placing the results received in a format suitable for the Siebel CRM FraudCheck service. The GenericWorkflow may then return a result to the Siebel CRM FraudCheck service.

When the Sieble CRM FraudCheck service receives a result from the GenericWorkflow service, it may then format and display the result to the company agent using the Siebel CRM.

Figure 4:
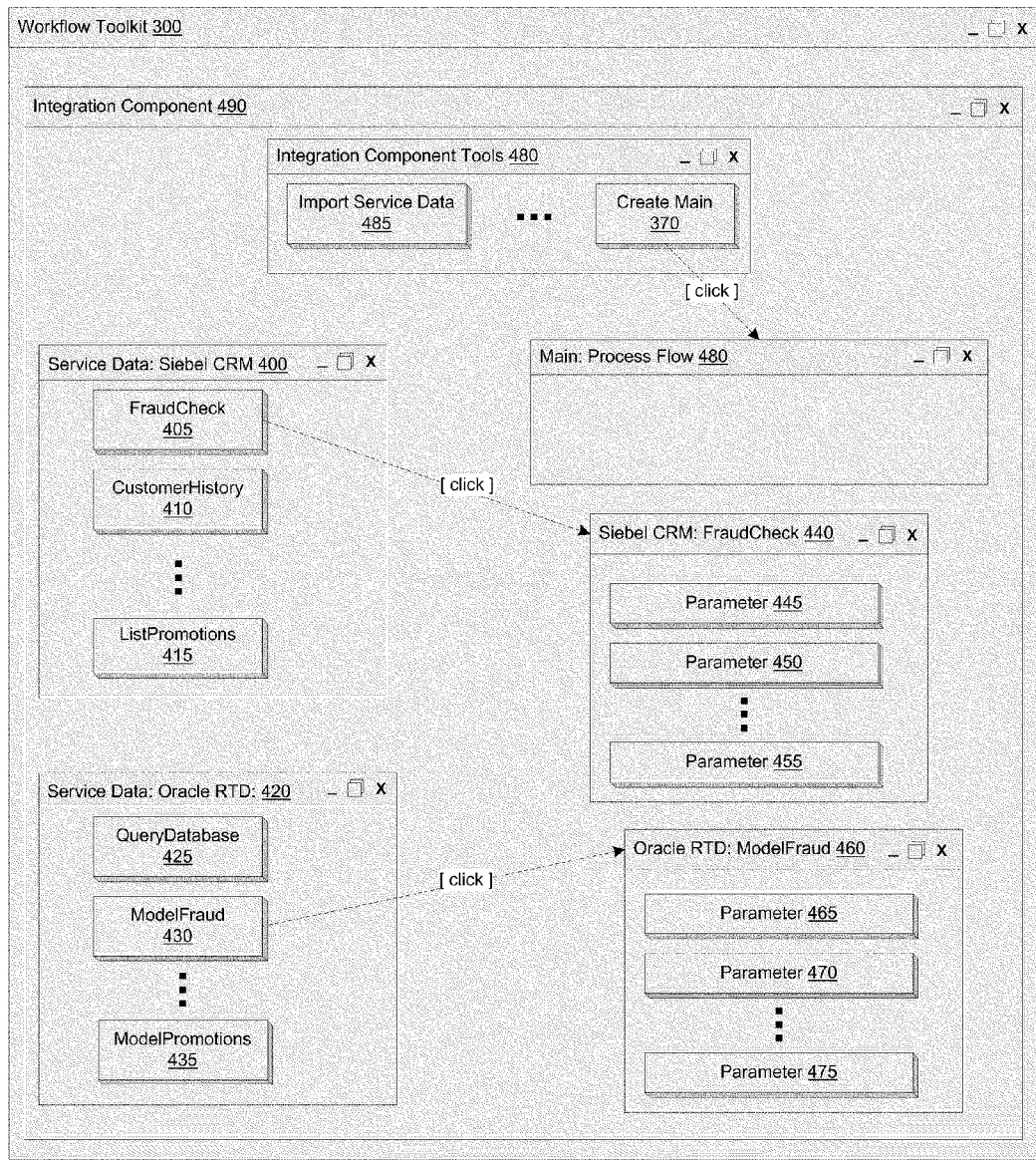
FIG. 4 presents aspects of the development area within the Workflow Toolkit for an example of developing a single integration component service.

FIG. 4 presents a few aspects of the Workflow Toolkit development environment that can create a single integration component. The Workflow Toolkit may present a user with a visual representation of the relevant aspects of the application programming interface of each application to be integrated. The Workflow Toolkit allows a user to create any number of integration components for integrating any service of one application with any service, or services, of another application. Upon completion, each integration component may then provide a service.

A first step for integrating a service is to create a integration component, such as "Integration Component 490." Initially, "Integration Component 490" is blank, as a user has performed no steps regarding any service integration. Each integration component created by the user may result in an encapsulated programming space for the created integration component. In other words, the integration component is a software module within the larger Extensible Workflow software application. As its own software module, an integration component provides for its own range of variable spaces and definitions.

In one sense, a result of the data encapsulation is that an integration component is like its own application that happens to exist within the Extensible Workflow. One difference is that a purpose of an integration component is only to integrate a single service from the Siebel CRM with one or more services of the Oracle RTD. By contrast, a purpose of the Extensible Workflow is to integrate every service of the Siebel CRM with those of the Oracle RTD. The Extensible Workflow accomplishes this broader integration, in part, by being composed of a collection of integration components.

A user may create any number of integration components by selecting either an icon, or a menu option for creating a new integration component within the Workflow Toolkit.

The Workflow Toolkit also provides options for importing configuration files for each application, which provide the Workflow Toolkit with information regarding the application API, such as each of the services provided, expected values by the services, and information regarding parameter quantities and types.

Once a configuration file has been loaded and processed, the Workflow Toolkit can present a list of services available for the Siebel CRM within a first window titled "Siebel CRM." A user may then click and drag any listed service from the "Siebel CRM" window into the "Integration Component 490" window.

After the user creates Integration Component 490, the user can integrate, for example, the FraudCheck service of the Siebel CRM with the ModelFraud service of the Oracle RTD. This association is made by dragging the FraudCheck 405 service icon listed in the Siebel CRM window into the Integration Component 490 window. Similarly, the user drags the ModelFraud 430 service icon listed in the Oracle RTD window into the Integration Component 490 window. Once this is done, the user is able to, within the workspace of the Integration Component 490 window, determine what actions can be performed by Integration Component 490 in order to integrate the Siebel CRM FraudCheck service with the Oracle RTD ModelFraud service.

An example integration of the Siebel CRM FraudCheck service with the Oracle RTD ModelFraud 430 service is as follows: (1) in response to the "Fraud Check" button click in the Siebel CRM user interface, the Siebel CRM FraudCheck 405 service is called; (2) the Siebel CRM FraudCheck 405 service then calls the Extensible Workflow integration component corresponding to the Siebel CRM service; (3) the Extensible Workflow receives the call from the Siebel CRM and Application Interface 200 will in turn call Integration Component 490; (4) Integration Component 490 performs some processing of the parameters contained in the call and some processing of any stored and relevant metadata; (5) Integration Component 490 then calls the ModelFraud 430 service of the Oracle RTD; (6) the Oracle RTD ModelFraud 430 service may then process any information received through any parameters and calculates a result; (7) the Oracle RTD returns the result to Integration Component 490; (8) Integration Component may then perform some processing of results received from Oracle RTD ModelFraud 430; (9) Integration Component 490 may then return a result to the Siebel CRM FraudCheck 405 service; and (10) the Siebel CRM FraudCheck 405 service processes the received result and may display the result on the Siebel CRM user interface.

During development of the integration component, the user may drag the "FraudCheck" service into Integration Component 490. As a result, Integration Component 490 becomes associated with the FraudCheck 405 service. A further result that affects Integration Component 490 is that each of the parameters associated with FraudCheck 405 are now accessible by and may be manipulated by the instructions and data structures within Integration Component 490. In other words, the parameters are now part of the encapsulated programming space of Integration Component 490. This behavior is to ensure that only the integration component determined by the user to be associated with the service, may access any aspect of processing the service. This prevents other integration components from being able to access or inadvertently affect any handling of the service by the Extensible Workflow, unless the user chooses to provide such access.

Similarly, when a user drags the "ModelFraud" service, listed within the services for the Oracle RTD, ModelFraud 430 becomes associated with Integration Component 490. A user may drag multiple service calls listed within the Oracle RTD into Integration Component 490, if a user determines that multiple calls to multiple services within the Oracle RTD are necessary to satisfy the expected result of service FraudCheck 405 within the Siebel CRM.

A different embodiment is possible where each of the Siebel CRM, the Oracle RTD, and the Extensible Workflow are executing within a single computer system. The method by which the coupling is accomplished is not relevant to the operation of each of the components of the system: an application, an Extensible Workflow, and another application.

Another embodiment allows for one application to be integrated to more than one application through the Extensible Workflow. For example, if in addition to the Oracle RTD modeling engine, two other modeling engines were introduced to perform specialized calculations. In this case, a single service on the Siebel CRM may be integrated to all three modeling engines. This may be advantageous when the integration component can provide a better result to the Siebel CRM service call if it combines results from more than one modeling engine. This feature can also serve to simply distribute the processing of the result in cases where the result can be calculated in parallel, among the multiple applications.

The Workflow Toolkit may also perform validation checks from information derived from the configuration files. Validation checks may include checking that the integration component returns the correct type of return value based on the type expected from the associated service call. The type checking may be done at the time the Extensible Workflow is compiled.

Other validation checks may be performed during development, such as a validating that one service from the Siebel CRM is not associated with more than one integration component. Otherwise, for example, if the Seibel CRM FraudCheck service was associated with two or more integration components, when FraudCheck 405 was called, it would be impossible to determine which integration component to call. However, more than one Siebel CRM service may call the same integration component.

The Workflow Toolkit may also provide the user with information for managing the integration process. Such information may include generating a graph of service calls from and to each associated application and from and to each integration component. Using the above example, the Siebel CRM service call FraudCheck 440 would be a node in the graph, and a line could connect it to a node for Integration Component 490, and another line could be drawn from Integration Component 490 to a node for Oracle RTD service call ModelFraud 460. In this way, the developer can inspect a visual display of which services on the Siebel CRM are associated with which integration components, and which integration components are associated with which Oracle RTD services.

Another embodiment allows an integration component to assume some of the features of Generic Workflow 310. This is to say that instead of correlating a single service to a single integration component, a single integration component can perform different functions. The function to be performed by the integration component can be determined by the event type, similar to how the Generic Workflow 310 processes the event type. In this way, the integration components can be grouped into classes of services. For example, there may be 3 different types of fraud-related service calls and 5 different types of service calls for calculating special promotions. In this case, one integration component can be designed for handling the 3 different types of fraud-related service calls, and when this integration component is called, the appropriate fraud-related service can be determined by the event type. Similarly, another integration component can be designed to handle all promotion-related service calls from the Siebel CRM.

After the user has created an integration component for satisfying each Siebel CRM service, the user may issue the compile command from the Workflow Toolkit menu. Once compiled, the Extensible Workflow can perform the integration of the Siebel CRM with the Oracle RTD.

Figure 5:
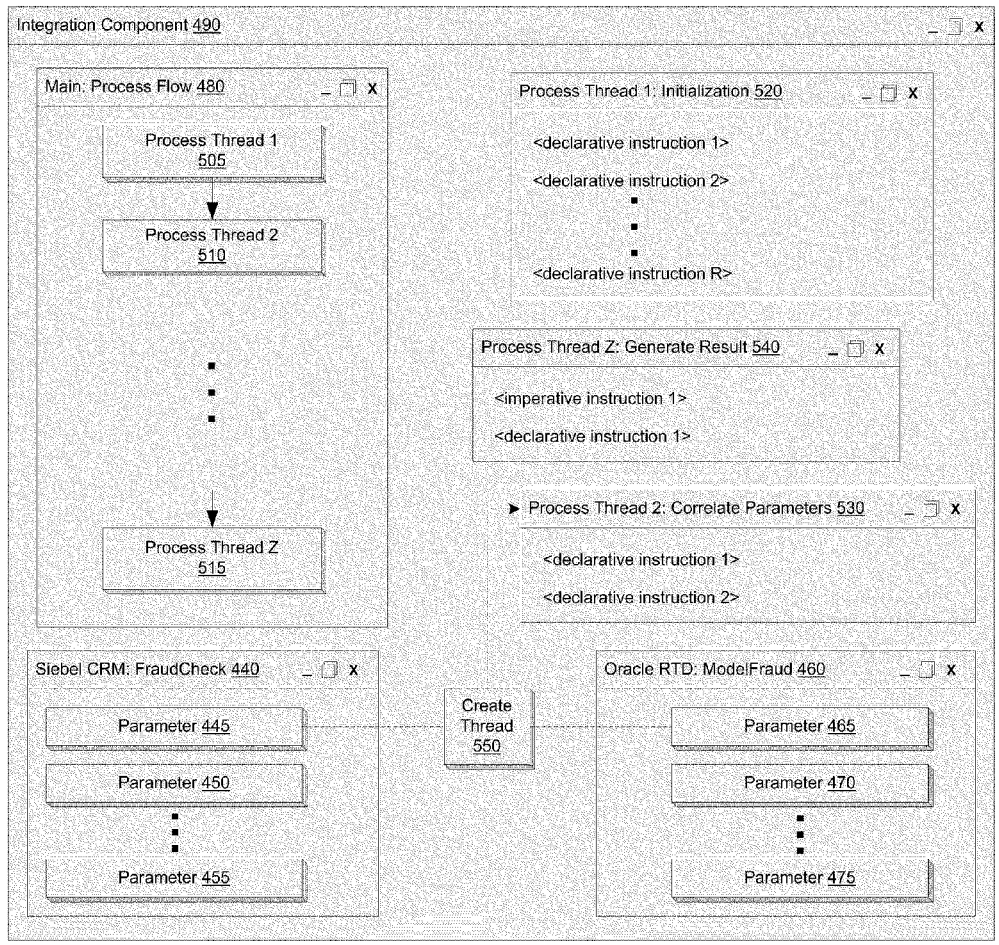
FIG. 5 presents further aspects of the development area within the Workflow Toolkit for developing the single integration component service introduced in FIG. 4.

FIG. 5 presents additional features available for developing "Integration Component 490." It is within this integration component window that a significant portion of the work of integrating the FraudCheck 405 service from the Siebel CRM with services from the Oracle RTD is specified.

Integration Component 490 is a window within the Workflow Toolkit. For each integration component created by the user, there will be a corresponding integration component window in which the application service calls associated with the integration component may be integrated. Within an integration component, a user may create a process flow that can define every processing step taken when the integration component is called. After the user compiles the Extensible Workflow, each integration component window will correspond to a runtime service within the Extensible Workflow executable.

The processing steps within a integration component may include any combination of both imperative and declarative instructions. In other words, while aspects of the integration may be accomplished visually, some aspects may require finer control over the integration steps. Thus, within the integration component, a user may insert software programming instructions, such as calls to software libraries and other instructions in any programming language.

The overall sequence of processing steps is determined by the combined instructions of each defined process thread. A process thread can be considered to be a set of processing steps. As a simple example, process thread 1, may perform some initial runtime parameter checks, such as whether or not a parameter value is within an allowable range of values.

One process flow is defined per integration component. The process flow may be composed of any number of process threads. For each process thread created, the user is provided a window in which a combination of imperative and declarative instructions can be defined.

A process thread may be created in two ways. The first way is from the integration component window menu, which creates an independent process thread. An independent process thread, such as Process Thread 1, may contain initialization instructions. Each process thread within the same integration component has access to each of the parameters corresponding to the services dragged into the integration component. That is, each process thread in "Integration Component 490" may access each of the parameters for services "FraudCheck" of the Siebel CRM and "ModelFraud" of the Oracle RTD.

The second way to create a process thread is by clicking on the "Create Thread" icon resting on a line drawn between a parameter in the window for the first application service and a parameter in the window for the second application service. A user may associate a parameter from one service with a parameter from another service by dragging the parameter button within the first application's service window onto a parameter button from one window onto a parameter button in the second application's service window. The result is that a connecting, dotted line will be visible between the parameters of the services.

In a simple case, given an equal number and equal types of parameters between FraudCheck 405 and ModelFraud 430, a user may simply drag each parameter button from FraudCheck 405 onto the corresponding ModelFraud 430 parameter button. Once these connections are made, the user selects the "Create Thread" option from the integration component window menu. In this simple case, no additional processing beyond correlation of parameters is performed. A single process thread window may list an instruction for calling ModelFraud 430 and returning the received result.

In a more involved case, some processing will be required in order to make the information received from the parameters in FraudCheck 405 into parameters suitable for the call to ModelFraud 430. For example, if FraudCheck 405 has two parameters and ModelFraud 430 has more or less than two parameters. In the case that ModelFraud 430 has one parameter, the instructions within one of the process threads will need to determine how to combine the received parameters in FraudCheck 405 in order to call ModelFraud 430. Or, in the case in which ModelFraud 430 has more than two parameters, the instructions within the process thread must determine how to use the two parameters received from FraudCheck 405 for generating the three or more parameters expected by the call to ModelFraud 430.

The user determines the execution order of the created process threads within the integration component. This ordering may be accomplished in a drag-and-drop fashion, by clicking and holding a process thread while dragging it to the position intended. Once the execution order is determined, and all integration steps are defined, the integration component is fully specified. Once all integration components are created and fully specified, the Extensible Workflow can be compiled.

The techniques and methods discussed above may be implemented in software as one or more software programs, using a variety of computer languages, including, for example, traditional computer languages such as assembly language and C; object oriented languages such as C++ and Java; and scripting languages such as Perl and Tcl/Tk. Software may comprise program instructions executable by one or more processors to perform any of the functions or methods described above.

Various embodiments may further include receiving, sending, or storing instructions and/or data implemented in accordance with the foregoing description upon a computer-accessible medium. Generally speaking, computer accessible media may include storage media or memory media such as magnetic or optical media, e.g., disk or CD-ROM, and non-volatile media such as RAM (e.g. SDRAM, DDR, RDRAM, SRAM, etc.), ROM, etc.

Although the invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computer-implemented method comprising:
a user interface displaying
a first list of application programming interface (API) services provided by a first application, and
a second list of API services provided by a second application;
providing a list of declarative instructions;
generating an integration component in response to a user selecting a first API service from the first list, a second API service from the second list, and one or more declarative instructions from the list of declarative instructions, wherein when the integration component is called by the first API service, the integration component calls the second API service after the integration component processes one or more first parameters in accordance with the selected one or more declarative instructions;
in response to being called, the second API service returns a second API result; and
the integration component returns an integration result based on the second API result.

2. The computer-implemented method of claim 1, further comprising:
displaying a plurality of integration component types for selection by the user; and
generating the integration component in response to the user selecting one of the plurality of integration component types.

3. The computer-implemented method of claim 2, wherein the first list of services is a subset of all services provided by the computer system, wherein
the subset is determined by the selection of the one of the plurality of integration component types.

4. The computer-implemented method of claim 1, wherein the first application executes on a first computer system, and
the second application executes on a second computer system.

5. The computer-implemented method of claim 1, wherein each service of the first list of services is configured to generate a respective result, and
each service of the second list of services is configured to generate a respective result.

6. The computer-implemented method of claim 1, wherein the first API service is called with the one or more first parameters,
the second API service is called with one or more second parameters, and the integration component is called with one or more integration parameters.

7. The computer-implemented method of claim 6, wherein the integration component generates the integration result according to the selected one or more declarative instructions.

8. The computer-implemented method of claim 7, further comprising:
generating software code that executes the integration component.

9. The computer-implemented method of claim 5, wherein the list of declarative statements is a subset of all declarative statements provided.

10. The computer-implemented method of claim 6, wherein
the one or more first parameters comprise metadata, wherein
the metadata comprises an event type, one or more event parameters, an expected result, and an actual result; and
the integration component generates the integration result based on the expected result.

11. The computer-implemented method of claim 1, further comprising:
generating an extensible workflow comprised of one or more integration components.

12. A non-transitory computer-readable storage medium storing instructions, wherein the instructions, when executed, are configured to:
display a user interface comprising
a first list of application programming interface (API) services provided by a first application, and
a second list of API services provided by a second application;
provide a list of declarative instructions;
generate an integration component in response to a user selecting a first API service from the first list, a second API service from the second list, and one or more declarative instructions from the list of declarative instructions, wherein when
the integration component is called by the first API service, the integration component calls the second API service after the integration component processes one or more first parameters in accordance with the selected one or more declarative instructions;
in response to being called, the second API service returns a second API result; and
the integration component returns an integration result based on the second API result.

13. The non-transitory computer-readable storage medium of claim 12 wherein:
the first API service is called with the one or more first parameters,
the second API service is called with one or more second parameters, and
the integration component is called with one or more integration parameters.

14. The non-transitory computer-readable storage medium of claim 13, wherein
the integration component generates the integration result according to the selected one or more declarative instructions.

15. The non-transitory computer-readable storage medium of claim 13, further comprising:
generating an extensible workflow comprised of one or more integration components.

16. A system comprising:
a processor; and
a memory coupled to the processor, wherein the memory stores program instructions executable by the processor to
display a user interface comprising
a first list of application programming interface (API) services provided by a first application, and
a second list of API services provided by a second application;
provide a list of declarative instructions;
generate an integration component in response to a user selecting one or more declarative instructions from the list of declarative instructions, a first API service from the first list and a second API service from the second list, wherein when
the integration component is called by the first API service, the integration component calls the second API service after the integration component processes one or more first parameters in accordance with the selected one or more declarative instructions;
in response to being called, the second API service returns a second API result; and
the integration component returns an integration result based on the second API result.

17. The system of claim 16 wherein:
the first API service is called with the one or more first parameters,
the second API service is called with one or more second parameters, and
the integration component is called with one or more integration parameters.

18. The system of claim 16, further comprising:
generating an extensible workflow comprised of one or more integration components.

* * * * *

UNITED STATES PATENT AND TRADEMARK OFFICE
CERTIFICATE OF CORRECTION

PATENT NO. : 8,473,970 B2
APPLICATION NO. : 12/712354
DATED : June 25, 2013
INVENTOR(S) : Machiraju et al.

Page 1 of 1

It is certified that error appears in the above-identified patent and that said Letters Patent is hereby corrected as shown below:

In the Specification

In column 7, line 62, delete "Sieble" and insert -- Siebel --, therefor.

Signed and Sealed this
Twenty-second Day of October, 2013

Teresa Stanek Rea
*Deputy Director of the United States Patent and Trademark Office*